(12) United States Patent
Van Der Werf et al.

(10) Patent No.: US 9,403,551 B2
(45) Date of Patent: Aug. 2, 2016

(54) APPARATUS COMPRISING A BODY SUPPORT FRAME AND MEANS FOR MANOEUVRING THIS FRAME WITH RESPECT TO A SPORTS BOARD

(71) Applicant: PRODAPTIVE IP B.V., AL 's-Gravenhage (NL)

(72) Inventors: Regina Johanna Albertina Van Der Werf, RW The Hague (NL); Laura Klauss, AX Delft (NL); Tim Helming, EV Oegstgeest (NL)

(*) Notice: Subject to any disclaimer, the term of this patent is extended or adjusted under 35 U.S.C. 154(b) by 0 days.

(21) Appl. No.: 14/765,243

(22) PCT Filed: Jan. 30, 2014

(86) PCT No.: PCT/NL2014/050051
§ 371 (c)(1),
(2) Date: Jul. 31, 2015

(87) PCT Pub. No.: WO2014/120007
PCT Pub. Date: Aug. 7, 2014

(65) Prior Publication Data
US 2016/0001806 A1    Jan. 7, 2016

(30) Foreign Application Priority Data
Feb. 1, 2013    (NL) ..................................... 2010221

(51) Int. Cl.
*B62B 17/06*        (2006.01)
*B62B 13/04*        (2006.01)
*B62B 17/00*        (2006.01)

(52) U.S. Cl.
CPC ............. *B62B 17/063* (2013.01); *B62B 13/043* (2013.01); *B62B 17/061* (2013.01); *B62B 17/062* (2013.01); *B62B 17/005* (2013.01)

(58) Field of Classification Search
CPC .... B62B 17/062; B62B 17/063; B62B 17/06; B62B 15/00; B62B 15/001; B62B 15/002; B62B 15/007; A63C 11/001; A63C 17/28
See application file for complete search history.

(56) References Cited

U.S. PATENT DOCUMENTS

| 886,451 A | * | 5/1908 | Windsor | ............... A01D 46/243 280/19 |
| 1,065,876 A | * | 6/1913 | Kennard | ................. B62B 15/00 280/24 |

(Continued)

FOREIGN PATENT DOCUMENTS

EP    1 759 738 A1    3/2007
EP    1 867 367 A1    12/2007

OTHER PUBLICATIONS

International Search Report for PCT/NL2014/050051, Date of mailing: May 30, 2014.

(Continued)

*Primary Examiner* — Jeffrey J Restifo
*Assistant Examiner* — Erez Gurari
(74) *Attorney, Agent, or Firm* — Hoffmann & Baron, LLP

(57) ABSTRACT

According to the invention, there is provided a frame (4) for a sports board (2) with a length direction (X) and a width direction (Y), wherein the frame comprises a base frame portion (6) for mounting the frame on the sports board along the length direction of the sports board, a supporting frame part (8) provided with a frame connection (18) with the base frame portion, wherein the width direction (Y) of the supporting frame part (8) is in use substantially parallel to the length direction (X) of the sports board (2), at least one handle (46, 48) attached to the base frame portion (6) along the width direction (Y) of the supporting frame part (8), a seat (36) for supporting a bottom of a user in use, wherein the seat (36) is attached to the supporting frame part (8) aligned with the at least one handle, wherein a front side (37) of the seat is substantially parallel to the width direction of the supporting frame part (8), wherein the frame connection comprises an in at least a length direction of the supporting frame part (8) moveable connection between the supporting frame part and the base frame portion, such that the seat is moveable along a first trajectory along the length direction of the supporting frame part relative to the base frame portion (6).

21 Claims, 6 Drawing Sheets

(56) References Cited

U.S. PATENT DOCUMENTS

| | | | | |
|---|---|---|---|---|
| 4,384,731 | A * | 5/1983 | Webb | A63C 17/01 280/291 |
| 5,205,570 | A * | 4/1993 | Brown | B62B 15/00 280/14.27 |
| 5,433,458 | A * | 7/1995 | Kampe | B62B 13/12 280/14.28 |
| 5,492,074 | A * | 2/1996 | Lekhtman | B62B 15/001 114/39.16 |
| 6,179,305 | B1 | 1/2001 | Capozzi et al. | |
| 6,375,208 | B1 * | 4/2002 | Lee | A63B 21/157 280/220 |
| 2002/0030333 | A1 | 3/2002 | Graham | |
| 2004/0251645 | A1 * | 12/2004 | Morin | A63C 5/031 280/16 |
| 2012/0091671 | A1 * | 4/2012 | Soloviev | B62B 17/061 280/20 |
| 2013/0187350 | A1 * | 7/2013 | Schultz, Jr. | B62B 17/08 280/18 |
| 2013/0192928 | A1 * | 8/2013 | Lamos | A01B 75/00 182/230 |

OTHER PUBLICATIONS

Written Opinion for PCT/NL2014/050051, Date of mailing: May 30, 2014.

* cited by examiner

APPARATUS COMPRISING A BODY SUPPORT FRAME AND MEANS FOR MANOEUVRING THIS FRAME WITH RESPECT TO A SPORTS BOARD

CROSS-REFERENCE TO RELATED APPLICATIONS

The present application is the National Stage of International Application No. PCT/NL2014/050051, filed Jan. 30, 2014, which claims the benefit of Netherlands Application No. NL 2010221, filed Feb. 1, 2013, the entire contents of which are incorporated by reference herein.

TECHNICAL FIELD

The present invention relates generally to an apparatus or frame for sports purposes. The present invention relates more particularly to an apparatus or frame for a person to participate in board sports such as, but not limited to the sport of snowboarding, without requiring lower body strength or control.

BACKGROUND ART

People can participate in sit skiing without requiring lower body strength. A sit-ski setup can be mounted on a sports board, e.g. a snowboard, surfboard, or skateboard, as well. Because of the width of the board, it is more difficult to control edging than with a sit-ski setup mounted on a normal ski, but people are more or less able to ride, using outriggers in the hand, to aid balance. Thus far, this had been the most controllable solution for so called sit-down snowboarding.

In regular board sports, a specific "sideway" body position is assumed with respect to the board. A sit-ski mounted sideways on a snowboard as such does not allow the user to control the board enough for a safe ride, as the feet are sticking out. A structure for a body support in patent document U.S. Pat. No. 6,179,305 in this particular field provides for the aforementioned sideway body position, however it does not allow movement of the seat other than for shock absorption in the vertical direction. This will result in excessive forward and backward bending of the user's upper body in order to steer the board, and a lack of precision and balance in the steering technique will result. Even if the user manages to keep balanced, gain some speed, and ride the board on the edge, the board trajectory is determined by the edge radius. In the abovementioned document, the upper body motional freedom is severely limited by the sit-ski bucket, lacking other means for laterally adapting the centre of mass back with respect to the centreline of the board.

The invention differs from the prior art in that it allows for torquing and precision edging of the board through application of manual force upon the handlebars. It also differs as it allows for movement of the seat and knee supports to project the body centre of mass in the proper position over the board while maintaining an upright upper body posture, which is a great advantage in keeping balance.

In patent document EP1867367, the use of handlebars as a means of controlling a board within the context of regular board sports teaching aids has been combined with a seat placed in the middle of the board. The lack of support and motion would render the board uncontrollable for many users with severe disabilities in the lower extremities.

SUMMARY OF INVENTION

It would be desirable to provide a body support frame for mounting on a board, which improves board-handling for a person during sit-down sports-boarding.

Therefore, there is provided a frame for a sports board with a length direction and a width direction, wherein the frame comprises a base frame portion for mounting the frame on the sports board along the length direction of the sports board, a supporting frame part provided with a frame connection with the base frame portion, wherein the width direction of the supporting frame part is in use substantially parallel to the length direction of the sports board, at least one handle attached to the base frame portion along the width direction of the supporting frame part, a seat for supporting a bottom of a user in use, wherein the seat is attached to the supporting frame part aligned with the at least one handle, wherein a front side of the seat is substantially parallel to the width direction of the supporting frame part, wherein the frame connection comprises an in at least a length direction of the supporting frame part moveable connection between the supporting frame part and the base frame portion, such that the seat is moveable along a first trajectory along the length direction of the supporting frame part relative to the base frame portion.

In board sports, the board performance is controlled by movement of the centre of mass of the rider with respect to both the slope and the board itself. in which for the latter deliberate flexion and extension of the ankles and knees play a large role. For example, the edge angle makes the difference between carved turns and slipped turns. The ability to decrease board edging angle relative to the slope, without changing the centre of mass with respect to the slope, is key in letting the board "break out", resulting in slipped turns. On the other hand, an increase in the edging angle will allow a rider to make the board turn radius smaller in carved turns. In all these techniques the resulting force of gravity and centripetal forces combined is projected over the board's edge, except when the edge-to-edge transition is made. Soft-boot riders in particular use their ankles to fine-tune such turns. The knees and hip joints play a large role in absorption of bumps and jumps, and in nose-tail movements that allow for quicker turning. In beginner turns, a rider can deliberately lower the edge angle and increase pressure at the front foot, whilst the back foot keeps the edge more inclined. This torquing of the board results in a rotating motion towards the fall line. (i.e. straight down). All these examples of common snowboard techniques require good strength and control over the lower extremities of the user.

The frame according to this aspect of the invention provides for a sideway sitting body position, as opposed to the forward sitting position in regular sit-skiing. The frame according to this aspect allows the board user an appropriate amount of lateral movement of the centre of mass with respect to the board. This motional freedom is necessary to accommodate common snowboard techniques such as side slipping on both heel and toe side, making slipped and carved turns and traversing a slope.

The apparatus according to the present invention is characterized in that it consists of a manoeuvrable frame supporting the user's weight. This frame allows for a motion that is limited to the appropriate amount of movement of the user's centre of mass with respect to the board in regular snowboarding. This freedom of movement in the said frame is necessary to accommodate common snowboard techniques such as side slipping on both heel and toe side, making slipped and carved turns and steering while traversing a slope. In order to initiate and fine-tune body movements as well as directly control the board the apparatus includes a set of handlebars.

According to an embodiment of the frame, the frame connection comprises between the supporting frame part and the base frame portion a connection moveable in the width direction of the supporting frame part, such that the seat is moveable over a second trajectory along the width direction of the supporting frame part relative to the base frame portion.

According to a further embodiment of the frame, the frame connection comprises a rotational connection, wherein the frame connection is rotatable along at least a rotational axis in the length direction and/or the width direction of the supporting frame part.

According to another embodiment, the seat extends in use over the seating surface and a backside of at least an upper leg part of the user and wherein the seat is relatively flexible in relation to the supporting frame part, such that the seat is bendable over the first trajectory along the length direction of the supporting frame part in relation to the base frame part.

According to yet another embodiment, the supporting frame part comprises a first supporting part and a second supporting part, wherein the seat is connected to the first supporting part and the second supporting part is connected to the base frame portion, and wherein between the first supporting part and the second supporting part in the length direction of the first supporting part a moveable connection is provided, wherein the seat is moveable over the first trajectory along the length direction of the first supporting part in relation to the second supporting part.

According to yet a further embodiment of the frame, the frame connection comprises a cardan joint for rotation of the supporting frame part relative to the base frame portion along a first rotational axis in the length direction of the supporting frame part and a second rotational axis in the width direction of the supporting frame part, such that the seat is moveable along the first trajectory along the length direction and the second trajectory along the width direction of the supporting frame part relative to the base frame portion.

According to another embodiment, the frame connection comprises a ball joint for rotation of the supporting frame part relative to the base frame portion along at least a first rotational axis in the length direction of the supporting frame part and a second rotational axis in the width direction of the supporting frame part, such that the seat is moveable along the first trajectory along the length direction and the second trajectory along the width direction of the supporting frame part relative to the base frame portion.

According to another embodiment, the at least one handle comprises a first handle and a second handle, wherein the seat is situated between the first handle and the second handle seen in the width direction of the supporting frame part.

Preferably, the frame comprises a first trajectory limiter for in use limiting the first trajectory of the seat along the length direction of the supporting frame part, more preferably to a maximal divergence of a middle longitudinal line of the seat relative to a middle longitudinal line of the base frame portion. Most preferably, the first trajectory is limited to a maximum diverging angle of the supporting frame part between 0° and 30°, which angle is determined between the supporting frame part in an equilibrium position in rest and the supporting frame part in a maximum position in the length direction of the supporting frame part in use.

According to a further embodiment, the frame comprises a second trajectory limiter for in use limiting the second trajectory of the seat along the width direction of the supporting frame part, more preferably to a maximal divergence of a middle transversal line of the seat relative to a middle transversal line of the base frame portion. Most preferably, the second trajectory is limited to a maximum diverging angle of the supporting frame part between 0° and 10°, which angle is determined between the supporting frame part in an equilibrium position in rest and the supporting frame part in a maximum position in the width direction of the supporting frame part in use.

Moving the centre of mass further laterally outward with respect to a middle line of the board results in an increase in lateral board angle, which is necessary to accommodate for basic carved turns by leaning into a turn. This only works once a user has enough speed. The limiters prevent the user from laterally moving the structure and the centre of mass too far beyond the board edges. Leaning into the limiter, enabling the board to carve a turn, allows for the highly rewarding and intrinsically motivating "board sports feeling" common in snowboarding, surfing and skateboarding.

Preferably, the first and/or second trajectory limiter is provided with a resilient element for moving the seat to a balanced position by means of resilience strength relative to the base frame portion, when the seat diverges relative to the base frame portion over the first trajectory along the length direction and/or second trajectory along the width direction of the supporting frame part.

Furthermore, the supporting frame part may be provided with a knee support at a distance of the seat for in use supporting the knees of the user. In addition, the frame may comprise a foot support connected to the base frame portion for in use support of the feet of the user.

According to a further embodiment, the seat extends over the bottom and a backside of at least an upper leg part of the user during use. Preferably, the seat is provided with fastening means for fastening the user during use.

Preferably, the base frame portion comprises a base support surface and a base frame extending from the support surface.

According to another embodiment, the seat is connected to a portion of the supporting frame part, which portion extends along the width direction of the supporting frame part.

According to a preferred embodiment, the frame comprises a receiving portion for receiving a supporting surface of a transporting means, wherein the receiving portion is positioned below the seat of the frame. To be able to access a chair lift to take the snowboarder to the piste, it is preferred that the chair can be put as far as possible underneath the seat, such that the centre of mass of the user is above the chair. It is therefore preferred that at the location of the seat the frame has an open structure or an opening for receiving the supporting surface of the chair lift chair. Additionally, the handles can be shaped such that the chair of the chair lift can be received within a further receiving portion provided at the handles. Preferably, the at least one handle is removably attached to the base frame portion.

According to a further embodiment, at least the seat is rotatable along a vertical rotational axis to allow a rotation relative to the sports board from a first position wherein the front side of the seat is substantially parallel to the width direction of the supporting frame part, to a second position wherein the front side of the seat is substantially perpendicular to the width direction of the supporting frame part.

Usually, caretakers would have to rotate the frame and the sports board over 90° to be able to get on or off a chairlift when using the frame on a sports board, requiring a lot of strength and energy of the caretaker. To get on or off the chair lift it is advantageous that the user can turn at least the seat, preferably the frame, from the skiing position, i.e. the front side of the seat being substantially parallel to the width direction of the supporting frame part, to a lift position, i.e. the front side of the seat being substantially perpendicular to the width direction of the supporting frame part. This rotation allows the user to get on and off independently of the caretaker. Being able to remove at least one handle would facilitate getting on and off even further.

Furthermore, the invention relates to a system of a sports board, such as a snowboard, and a frame as described above.

Preferably, the frame comprises a receiving portion for receiving a supporting surface of a transporting means for sports boards, wherein the receiving portion is positioned between the seat and the sports board.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Figure 1:
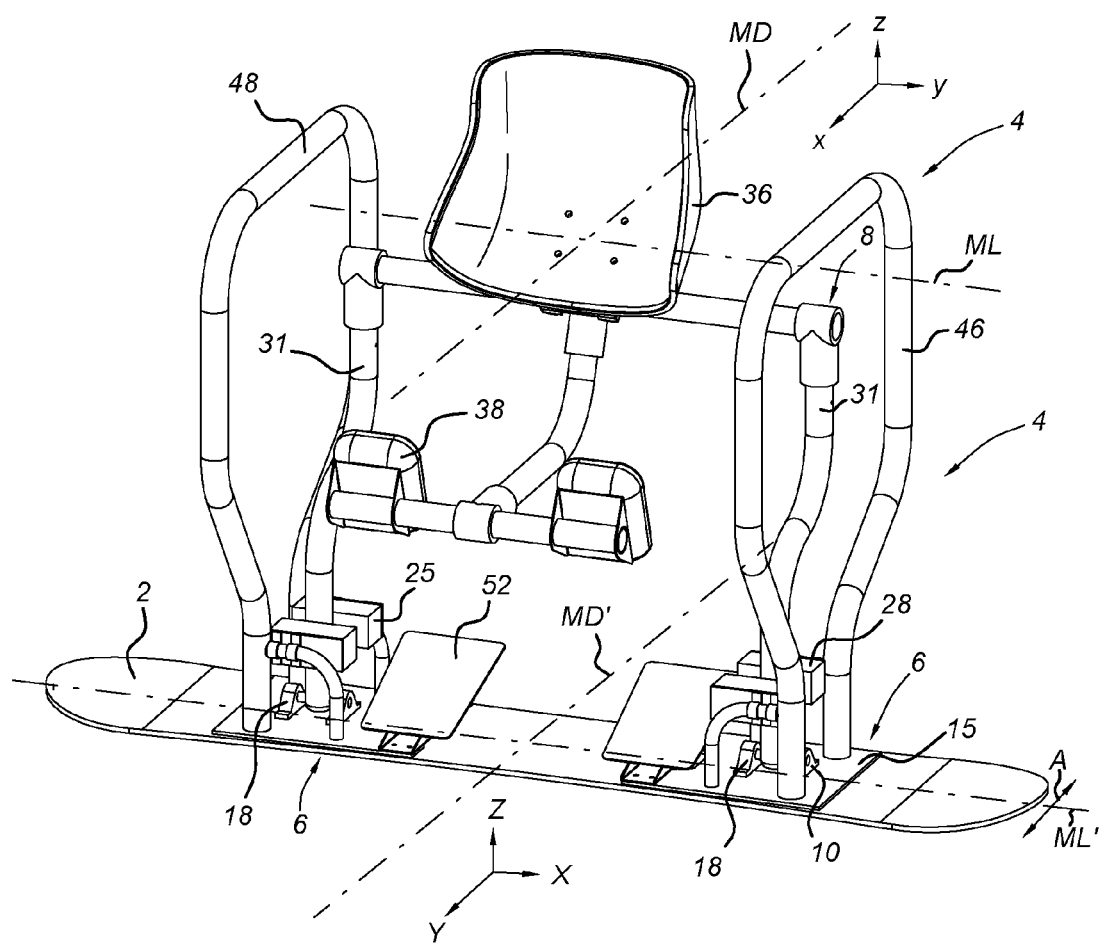
FIG. 1 schematically shows a minimal configuration of the frame attached to a snowboard.

FIG. 1 schematically shows a minimal configuration of the frame 4 attached to a snowboard 2. The minimal configuration of the apparatus consists of the frame 4 allowing for the movement trajectory in the toe-heel direction Dx by means of a rotation axis 10, the limiters 28 preventing further movement of the support frame 8 by constraining the movement trajectory of the support frame 8, the support frame 8 being connected to the base frame portion 6 by means of a hinge connection 18 allowing for the said movement trajectory in toe-heel direction Dx, and the limiter 28 is connected to the base plate 15 in a rigid manner. A flexible/damping material 25 is placed between the rigid structure of the limiter 28 and the support frame 8.

The Usage of the Current Invention

The handlebars 46, 48 are shaped in a manner in which direct manipulation by the user is possible in both heel side and toe side position of the support frame 8. The handlebars 46, 48 allow for direct board manipulation by the user, consisting of the board 2 torquing and edging, as well as movement of the user's centre of mass in multiple directions with respect to the board 2. To torque the board 2, one has to pull one handlebar 46, 48 towards the uphill edge while pushing the other towards the downhill edge. This way the board 2 can pivot downwards to the side of the handlebar 46, 48 that is pushed towards the downhill edge. The handlebars 46, 48 combined with the range of motion within the support frame 8 allow for upper body control over this motion of the centre of mass, as well as fine-tuning of the sports board trajectory over the slope through manual application of pressure, edging and torquing once the weight of the user is projected over the board edge.

The current invention has a manoeuvrable seat 36 and knee supports 38 that are placed in such a manner as to provide for a sideway body position over the board 2. The handlebars 46, 48 provided allow the user to directly manipulate board edging. Keeping the centre of mass projected over the uphill edge of the board 2 is possible by balancing the body with the manoeuvrable support frame 8 over the board edge. The user can engage in board sports movements by using arm strength and core muscles. It is within this particular combination that board performance can be sufficiently controlled and a true, sideway board sports feel can be experienced by people that do not have the leg strength necessary for participation in regular board sports.

The limiters 28 explicitly prevent the user from moving the support frame 8 too far beyond the board edges. Moving the centre of mass further results in a movement of the user and apparatus as a whole with respect to the slope. This accommodates for basic carved turns by leaning into a turn. This only works once a user has enough speed. Leaning into the limiter 28, allowing the board 2 to carve a turn allows for the highly rewarding and intrinsically motivating "board sports feeling" common in snowboarding, surfing and skateboarding. The limiters 28 are covered with a resilient material 25 with dynamic properties to provide for damping and elasticity, such as a rubber material. By manually pushing the handlebars 46, 48 away from the body, the user can decrease the board angle with respect to the slope while leaning into a turn. This will make the board slip through the turn instead of carve. This is a way to reduce speed, i.e. brake.

Figure 2:
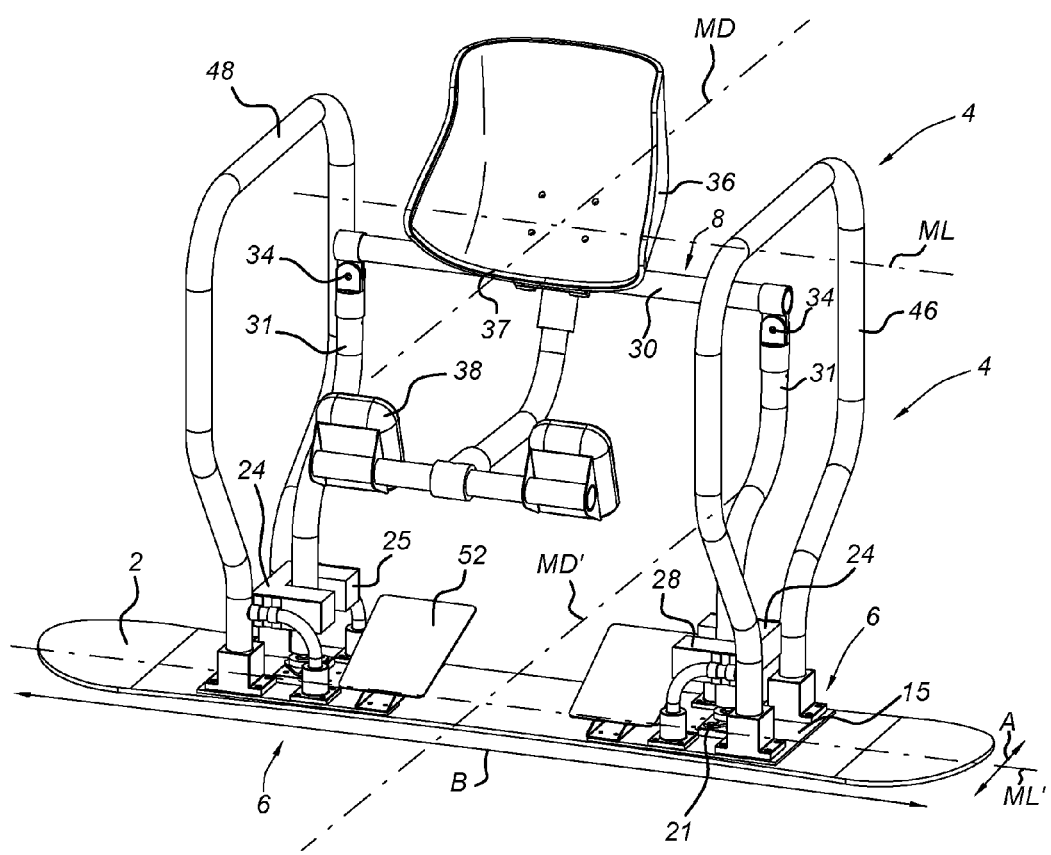
FIG. 2 presents a perspective view of a further embodiment of the frame mounted on the snowboard.

FIG. 2 shows another embodiment of the frame 4 and snowboard 2. This embodiment consists of the support frame 8, that allows for movement in nose-tail direction Dy of the sports board 2 by means of a four-bar linkage system, the frame allowing for the movement trajectory in the toe-heel direction Dx by means of rotation, the frame being connected to the base plate 15 by means of a ball joint connection 21 allowing for the above movements. The upper beam 30 of the support frame 8 is connected to the vertical beams 31 by means of a set of hinges 34. Springs may or may not be included to centre the support frame 8. The limiters 24, 28 prevent further movement of the support frame 8 by constraining the movement trajectory of the frame. The limiters 24, 28 are connected to the base plate 15 in a rigid manner. A flexible/damping material 25 is placed between the rigid structure of the limiter 24, 28 and the support frame 8.

Apart from the toe-heel side movement Dx, in regular snowboarding there also is a nose-tail movement Dy that makes the initiation of turns easier and allows for a more precise application of pressure along the board edge. The extra freedom of movement of the seat allows the advanced user to manipulate his centre of mass in the nose tail direction Dy while assuming a relatively neutral body position.

Figure 3:
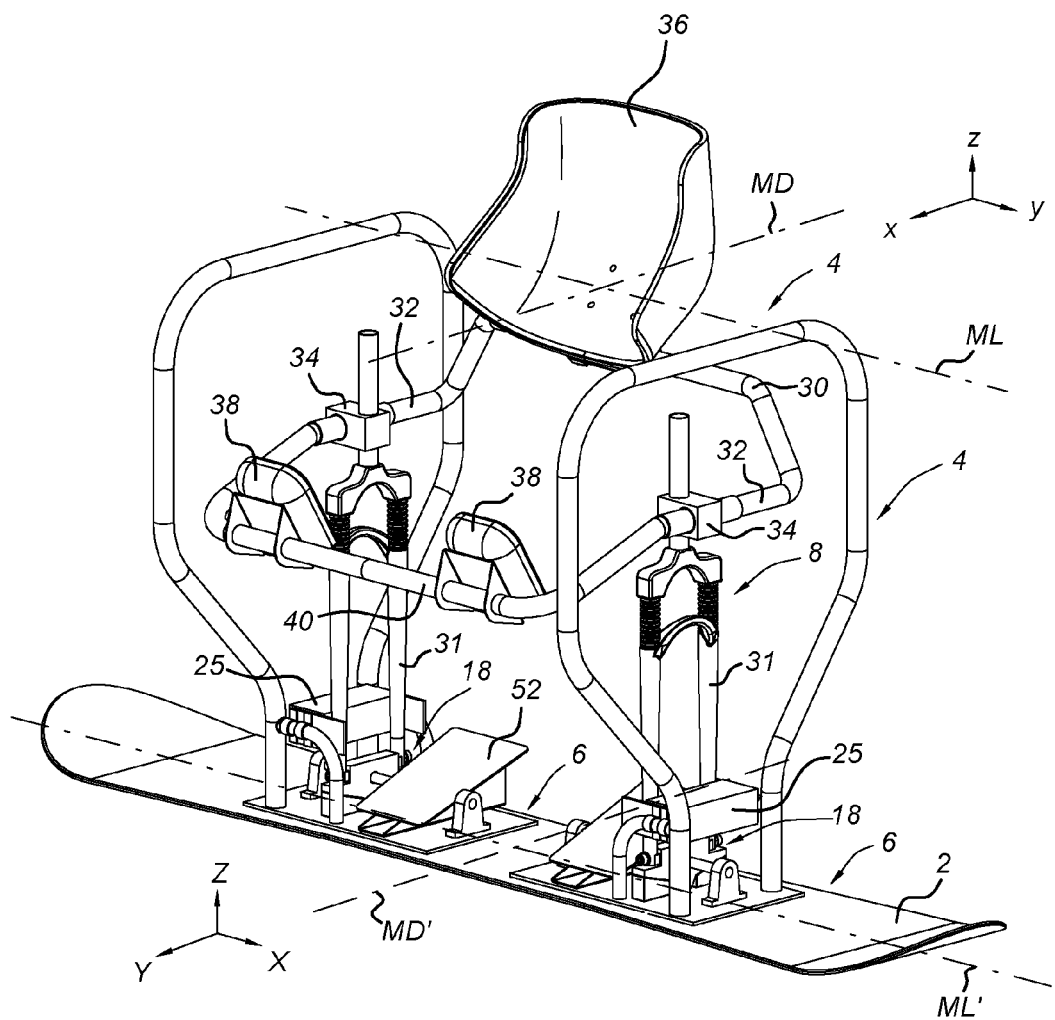
FIG. 3 shows a perspective view of another embodiment of the frame mounted on the snowboard

FIG. 3 shows a third embodiment with a second configuration consisting of a support frame 8 having a peripheral shape 30, 32, 40 connecting kneepads 38 and seat 36 rather than a single middle beam. The vertical beams 31 (or beam) of the support frame 8 have spring/damper properties, which vertical beams may or may not be standard bike fork elements. The connection of the vertical suspension element on an axis allows for the lower hinge movement in the four-bar linkage system for the nose-tail movement. A connecting part 34 of the peripheral shaped structure to the vertical suspended beam allows for the upper hinge movement of the said 4-bar linkage system.

Figure 6:
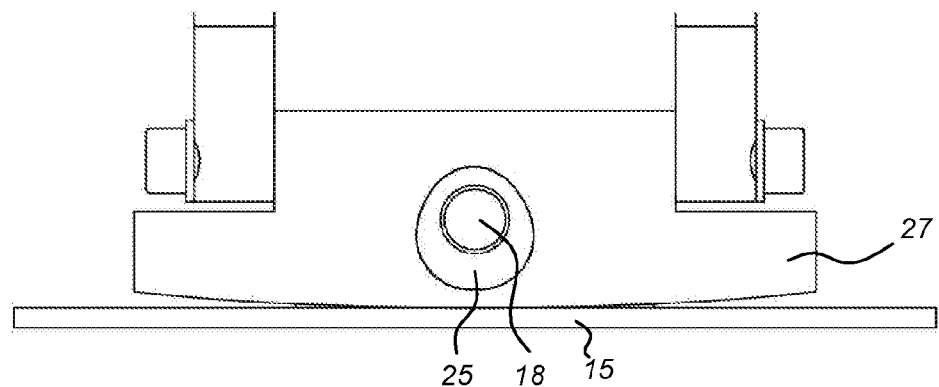
FIG. 6 shows a detail of a variant of the limiters.
Figure 7:
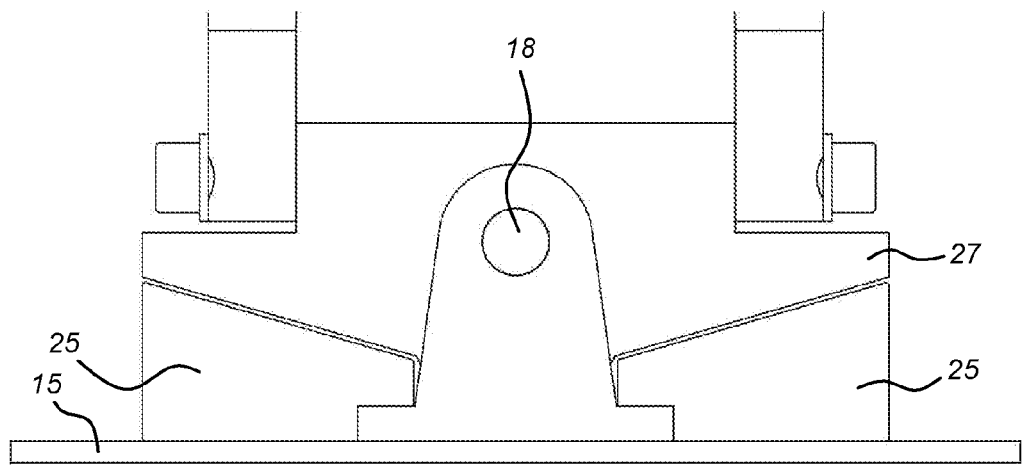
FIG. 7 shows a detail of another variant of the limiters.

In this third embodiment a subassembly 18 allows for a toe-heel movement with respect to the base plate, with either one of the following options, as shown in FIGS. 6 and 7:

Either the connection allows for a rotating motion in the toe-heel direction Dx. In this solution (FIG. 7) the limiting function is integrated in the said structure. A flexible material with damping properties 25 can be placed between the base plate 15 that functions as a limiter 28 and the bike fork connection structure 27.

Or the structure 27 has a radius allowing for a rocking motion in the toe-heel direction Dx, see FIG. 6. This motion is limited by the frame connection axis 18 surrounded by flexible material 25.

The application of a vertical structure 31 with an integrated suspension/damping function, allows the rider to gain control over the board and decreases impact on the body in uneven or rough terrain. Using standardized components allows for easy customizing to a user's weight and riding level.

Figure 4:
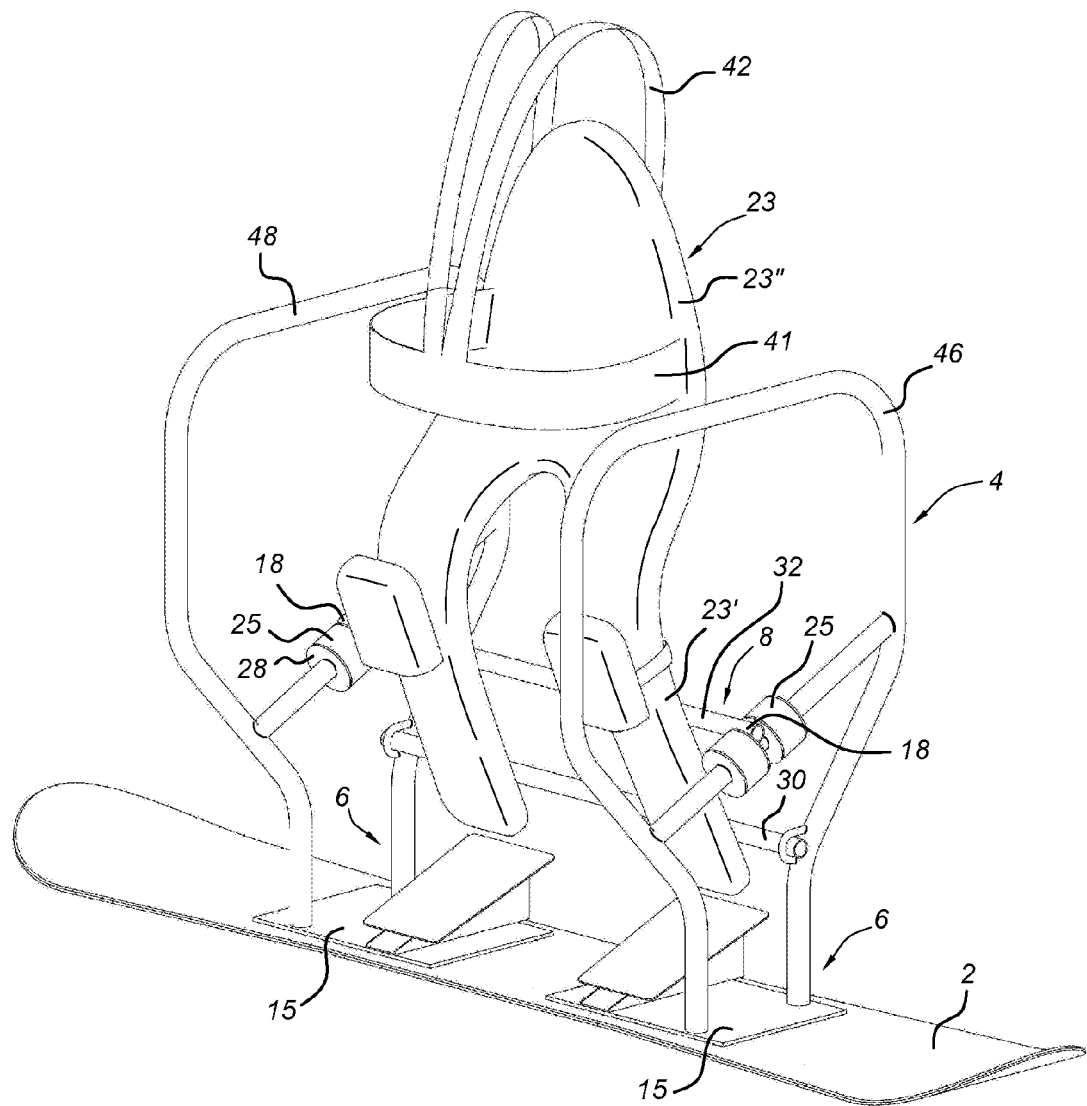
FIG. 4 shows a fourth embodiment of the frame on the snowboard.

FIG. 4 shows a fourth embodiment with a third preferred configuration consisting of a body support structure 23 following a semiseated shape from the lower legs 23' to the upper body 23" instead of a regular seat 36. The body support structure 23 is made of flexible, composite material that allows for bending of the structure in the toe-heel direction Dx, the body support structure 23 having straps for the knees/lower legs 43, said seat may or may not have a waist belt 41 and shoulder straps 42 that can be connected to the waist belt 41. The lower leg section of said part is mounted to a horizontal beam 30 forming the base frame portion 6 that in turn is rigidly connected to the handlebars 46 48, where the upper leg section is mounted to the cross bar 32 that is placed upon the handlebars as well, but allows for movement in the toe-heel direction Dx. This movement may or may not be limited by flexible material 25 and limiter 28.

Figure 5:
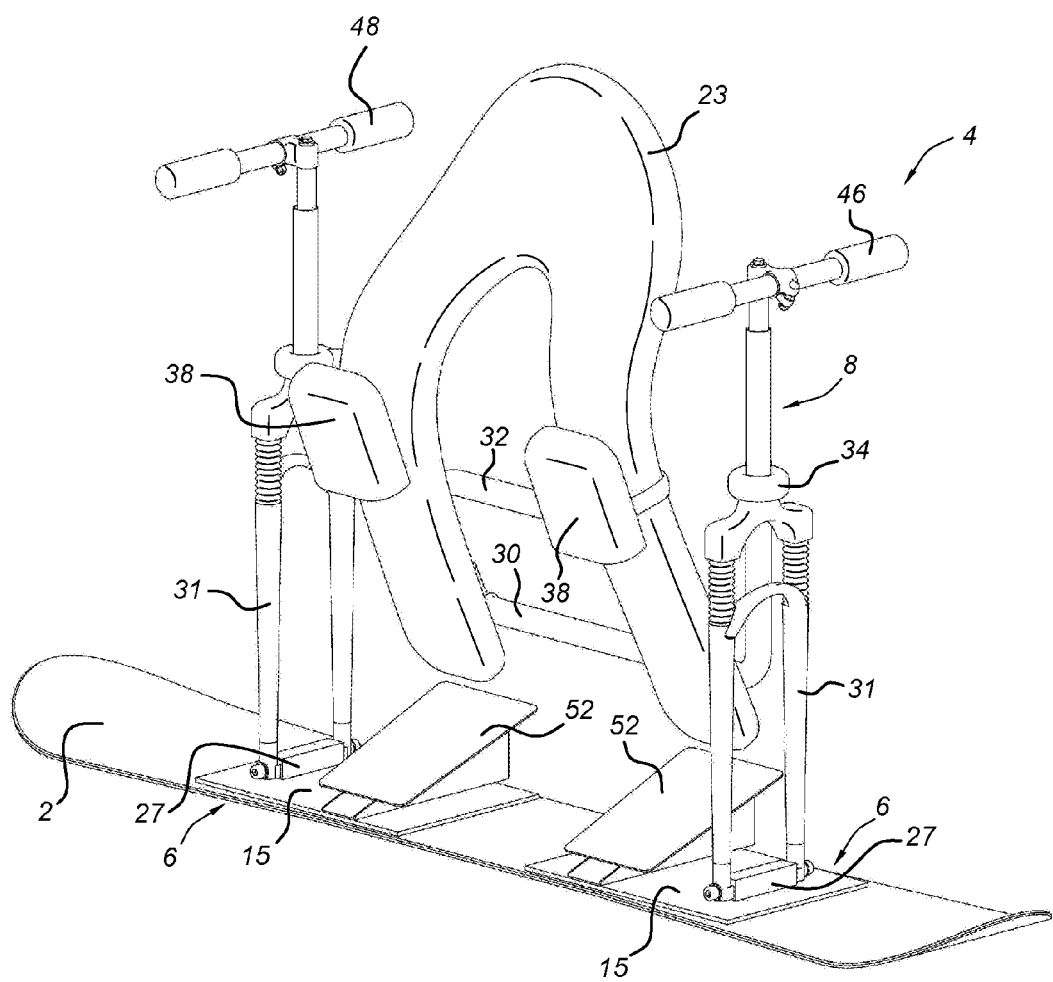
FIG. 5 shows an alternative configuration of the frame according to FIG. 4.

The handlebar construction consists of the handlebars 46, 48 with extra beams allowing for the movement and support structure of said horizontal beams, FIG. 5 shows another embodiment in which the handlebar and bike fork are integrated. The body support structure 23 and two supporting beams 30, 32 are mounted upon the bike fork steer mount with a structure that allows for the above-mentioned movement of the cross bar 32.

The connection of the bike fork element on an axis on the base frame portion is the lower hinge connection in the four-bar linkage system. The upper hinge is the support frame connector head and consists of a trapezoid shape rubber with 1⅛" hole, laid within in the frame connector. Said rubber has a stiffness and thickness allowing for the desired range of motion towards nose and tail.

In this configuration the rider can move his centre of mass towards the nose by moving the handlebars in the desired direction rather than pulling in an opposite manner.

Using a flexible body support along the back legs up to the spine allows for people who do not have core stability/core muscle strength to keep an upright position and maintain balance and to transfer forces when manipulating the handlebars, as well as leaning into a turn without the upper body collapsing. The extension of the four-bar linkage system into handlebars/grips allows for arm manipulation of the centre of mass, without requiring core muscle strength.

REFERENCE SIGNS LIST 1 assembly
2 board
4 frame
6 base frame portion
8 supporting frame part
10 rotational axis
14 fixation means
15 base plate
16 bolt connection
18 frame connection
20 base pivot connection
21 ball joint
22 transversal hinge connection
23 body support structure
23'. lower leg part
23". upper leg part
24 transversal range limiter
25 resilient material
26 longitudinal hinge connection
27 bicycle fork connection
28 longitudinal range limiter
30 support bar
31 vertical bar
32 crossbar
34 support hinge connection
36 seat
37 lower leg part
38 leg/knee support
39 upper body part
40 leg/knee support bar
41 waist belt
42 shoulder straps
43 knee straps
46 frontal handle bar
48 rear handle bar
50 hand grip
52 foot support
X longitudinal direction
Y transversal direction
Z height direction
W hand grip width
Dx longitudinal trajectory
Dy transversal trajectory

The invention claimed is:

1. Frame for a sports board with a length direction and a width direction, wherein the frame comprises
    a base frame portion for mounting the frame on the sports board along the length direction of the sports board,
    a supporting frame part provided with a frame connection with the base frame portion, wherein the width direction of the supporting frame part is in use substantially parallel to the length direction of the sports board,
    at least one handle attached to the base frame portion along the width direction of the supporting frame part,
    a seat for supporting a bottom of a user in use, wherein the seat is attached to the supporting frame part aligned with the at least one handle, wherein a front side of the seat is substantially parallel to the width direction of the supporting frame part, wherein the frame connection comprises an in at least a length direction of the supporting frame part moveable connection between the supporting frame part and the base frame portion, such that the seat is moveable along a first trajectory along the length direction of the supporting frame part relative to the base frame portion.

2. Frame according to claim 1, wherein frame connection comprises a connection moveable in the width direction of the supporting frame part between the supporting frame part and the base frame portion, such that the seat is moveable over a second trajectory along the width direction of the supporting frame part relative to the base frame portion.

3. Frame according to claim 1, wherein the frame connection comprises a rotational connection, wherein the frame connection is rotatable along at least a rotational axis in the length direction and/or the width direction of the supporting frame part.

4. Frame according to claim 1, wherein the seat extends in use over the seating surface and a backside of at least an upper leg part of the user and wherein the seat is relatively flexible in relation to the supporting frame part, such that the seat is bendable over the first trajectory along the length direction of the supporting frame part in relation to the base frame part.

5. Frame according to claim 1, wherein the supporting frame part comprises a first supporting portion and a second supporting portion, wherein the seat is connected to the first supporting portion and the second supporting portion is connected to the base frame portion, and wherein between the first supporting portion and the second supporting portion in the length direction of the first supporting portion a moveable connection is provided, wherein the seat is moveable over the first trajectory along the length direction of the first supporting part in relation to the second supporting part.

6. Frame according to claim 3, wherein the frame connection comprises a cardan joint for rotation of the supporting frame part relative to the base frame portion along a first rotational axis in the length direction of the supporting frame part and a second rotational axis in the width direction of the supporting frame part, such that the seat is moveable along the first trajectory along the length direction and the second trajectory along the width direction of the supporting frame part relative to the base frame portion.

7. Frame according to claim 3, wherein the frame connection comprises a ball joint for rotation of the supporting frame part relative to the base frame portion along at least a first rotational axis in the length direction of the supporting frame part and a second rotational axis in the width direction of the supporting frame part, such that the seat is moveable along the first trajectory along the length direction and the second trajectory along the width direction of the supporting frame part relative to the base frame portion.

8. Frame according to claim 1, wherein the at least one handle comprises a first handle and a second handle, wherein the seat is situated between the first handle and the second handle seen in the width direction of the supporting frame part.

9. Frame according to claim 2, comprising a first trajectory limiter for in use limiting the first trajectory of the seat along the length direction of the supporting frame part, wherein the first trajectory is preferably limited to a maximum diverging angle of the supporting frame part between 0° and 30°, which angle is determined between the supporting frame part in an equilibrium position in rest and the supporting frame part in a maximum position in the length direction of the supporting frame part in use.

10. Frame according to claim 9, wherein the frame comprises a second trajectory limiter for in use limiting the second trajectory of the seat along the width direction of the supporting frame part, wherein the second trajectory is preferably limited to a maximum diverging angle of the supporting frame part between 0° and 10°, which angle is determined between the supporting frame part in an equilibrium position in rest and the supporting frame part in a maximum position in the width direction of the supporting frame part in use.

11. Frame according to claim 9, wherein at least one of the first trajectory limiter or second trajectory limiter is provided with a resilient element for moving the seat to a balanced position by means of resilience strength relative to the base frame portion, when the seat diverges relative to the base frame portion over the first trajectory along the length direction and/or second trajectory along the width direction of the supporting frame part.

12. Frame according to claim 1, wherein the supporting frame part may be provided with a knee support at a distance of the seat for in use supporting the knees of the user.

13. Frame according to claim 1, comprising a foot support connected to the base frame portion for in use support of the feet of the user.

14. Frame according to claim 1, wherein the seat is provided with fastening means for fastening the user during use.

15. Frame according to claim 1, wherein the base frame portion comprises a base support surface and a base frame extending from the support surface.

16. Frame according to claim 1, wherein the seat is connected to a portion of the supporting frame part, which portion extends along the width direction of the supporting frame part.

17. Frame according to claim 1, wherein at least the seat is rotatable along a vertical rotational axis to allow a rotation relative to the sports board from a first position wherein the front side of the seat is substantially parallel to the width direction of the supporting frame part, to a second position wherein the front side of the seat is substantially perpendicular to the width direction of the supporting frame part.

18. Frame according to claim 1, wherein the at least one handle is removably attached to the base frame portion.

19. Frame according to claim 1, comprising a receiving portion for receiving a supporting surface of a transporting means, wherein the receiving portion is positioned below the seat of the frame.

20. System of a sports board and a frame according to claim 1.

21. System according to claim 20, wherein the frame comprises a receiving portion for receiving a supporting surface of a transporting means for sports boards, wherein the receiving portion is positioned between the seat and the sports board.

* * * * *